United States Patent [19]

Boris

[11] 3,928,621

[45] Dec. 23, 1975

[54] ANTIINFLAMMATORY 2-(2-AMINOALKYLAMINO)-1,2-DIPHENYLETHANOLS

[75] Inventor: Alfred Boris, Parsippany, N.J.

[73] Assignee: Hoffmann-La Roche Inc., Nutley, N.J.

[22] Filed: Oct. 10, 1974

[21] Appl. No.: 513,798

[52] U.S. Cl. .................................. 424/330
[51] Int. Cl. ............................. A61k 31/135
[58] Field of Search ........................ 424/330

[56] References Cited
OTHER PUBLICATIONS

Metlesics et al., J. Org. Chem. 35, pp. 3136–3138 (1970).

*Primary Examiner*—Stanley J. Friedman
*Attorney, Agent, or Firm*—Samuel L. Welt; Jon S. Saxe; George M. Gould

[57] ABSTRACT

A class of 2-(aminoalkylamino)-1,2-diphenylethanols has unexpected topical antiinflammatory activity. This activity is found in the erythro and threo isomers of these compounds as well as in the optical antipodes thereof. A preferred compound is erythro-2-(2-aminoethylamino)-1,2-diphenylethanol.

9 Claims, No Drawings

ANTIINFLAMMATORY 2-(2-AMINOALKYLAMINO)-1,2-DIPHENYLETHANOLS

BACKGROUND OF THE INVENTION

Erythro and threo 2-(2-aminoethylamino)-1,2-diphenylethanol have been prepared and described in a paper by Metlesics et al., J. Org. Chem. 35, 3136 (1970). No pharmacological activity has been attributed to these compounds in this paper.

DESCRIPTION OF THE INVENTION

The present invention relates to the discovery that 2-(2-aminoalkylamino)-1,2-diphenylethanols of the formula

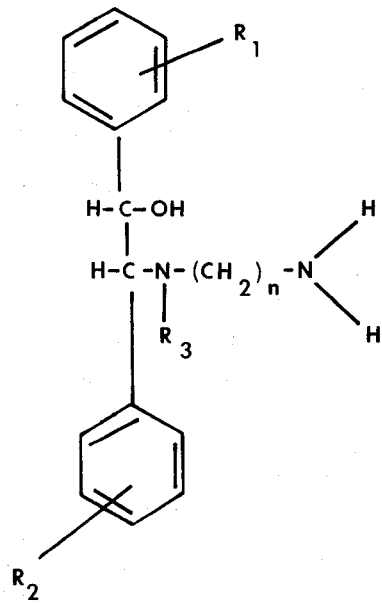

wherein $R_1$ and $R_2$ independently are hydrogen, halogen or lower alkyl provided, however, that one of $R_1$ or $R_2$ is hydrogen; $R_3$ is hydrogen or lower alkyl and n is an integer from 1 to 4 and isomers, optical antipodes and acid addition salts thereof, are pharmacologically active as topical antiinflammatory agents.

The compounds of formula I are conveniently prepared by reaacting an oxide of the formula

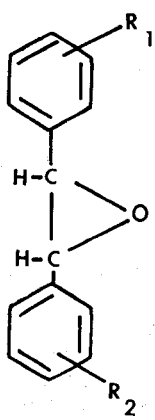

wherein $R_1$ and $R_2$ are as above
with a diamine of the formula

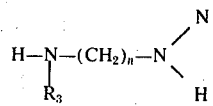

wherein $R_3$, $R_4$, $R_5$ and $n$ are as above.

The reaction between compounds of the formulae II and III can be carried out in a manner known per se such as, for example, by utilizing elevated temperatures, preferably reflux temperatures, and an excess of the diamine reactant as solvent.

It is generally observed that additions of amines to stilbene oxides proceeds in a stereospecific manner by trans addition. Thus it has been found that addition of a diamine of formula III to a trans stilbene oxide of formula II produces the erythro configuration of the desired product whereas a cis stilbene oxide yields the corresponding product in the threo configuration.

The optical antipodes of compounds of formula I can be readily obtained by resolution of the racemic form of said compounds in a manner known per se. A suitable resolution procedure involves the formation of diastereomeric salts of compounds of formula I with an optically active acid, i.e., (−) diacetone-2-keto-L-gulonic acid hydrate, selectively crystallizing out one of the diastereomers, then purifying and hydrolyzing this material with base, i.e., dilute sodium hydroxide, to yield the enantiomer. The other enantiomer can be isolated from the mother liquors by treatment with another optically active acid, i.e., d-tartaric acid to form the corresponding diastereomer salt which is then purified and hydrolyzed with base as above. Both enantiomers of the compounds of formula I exhibit topical antiinflammatory activity.

Preferred compounds of formula I are obtained where $R_1$ and $R_2$ are in the para position, or particularly preferred when $R_1$ and $R_2$ both are hydrogen; $R_3$ is hydrogen and n is 2. A particularly preferred compound of the invention is erythro-2-(2-aminoethylamino)-1,2-diphenylethanol.

As used herein the term "lower alkyl" is meant to include straight and branched chain saturated hydrocarbon radicals having from 1 to 7, preferably 1 to 4, carbon atoms. Suitable lower alkyl radicals include methyl, ethyl, n-propyl, i-propyl, n-butyl, n-hexyl and n-heptyl. Methyl is a most preferred lower alkyl radical.

The term "halogen" is meant to include chloro, bromo, iodo and fluoro radicals, most preferably chloro.

The compounds of the invention form acid addition salts with conventional pharmaceutically acceptable acids, i.e., inorganic acids such as hydrochloric acid, sulfuric acid, phosphoric acid, hydrobromic acid and the like, or organic acids such as citric acid, acetic acid, succinic acid, maleic acid, methanesulfonic acid, p-toluenesulfonic acid and the like.

The compounds of formula I are used in the form of conventional topical pharmaceutical preparations which contain said compounds in conjunction with conventional pharmaceutical organic or inorganic materials suitable for topical administration. Topical dosage forms of the present invention will contain from 0.01 to 20 weight percent preferably 1 to 10 weight percent of the compounds of formula I. The topical dosage forms can be a jelly, cream, lotion, oil, solution, emulsion, or any other conventional form for applying medication to the skin obtained by admixing the present compounds with known pharmaceutical topical carrier materials. Such compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers and the like. They can also contain other therapeutically useful materials.

The following examples are illustrative but not limitative of the invention. All temperatures are in degrees Centigrade.

EXAMPLE 1

(−) Erythro-2-(2-aminoethylamino)-1,2-diphenylethanol and (+) Erythro-2-(2-aminoethylamino)-1,2-diphenylethanol To a hot solution of 15 g. of (rac.)erythro-2-(2-aminoethylamino)-1,2-diphenylethanol was added 18 g. of (−) diacetone-2-keto-gulonic acid hydrate (DAG) and the solution left at room temperature overnight. A total of 13 g. of crystalline (−) erythro-2-(2-aminoethylamino)-1,2-diphenylethanol diacetone-2-keto-L-gulonate was separated by filtration. This salt was recrystallized from methanol until a constant melting point of 192°–3°C. was obtained. The salt was suspended in methylene chloride and shaken with ice cold dilute sodium hydroxide. The organic layer was separated, dried and concentrated in vacuo to dryness. The residue after crystallization from a tetrahydrofuran/ether mixture gave 6.6 g. of (−)erythro-2-(2-aminoethylamino)-1,2-diphenylethanol. The pure product formed colorless needles melting at 144°–5°C. and having a rotation $[\alpha]_D^{25°}$ −9.45°.

Anal. Calcd, for $C_{16}H_{20}N_2O$: C, 74.96; H, 7.86; N, 10.93. Found: C, 75.20; H, 7.96; N, 11.04.

The original filtrate from the DAG salt was concentrated in vacuo to dryness and the base was liberated as above. The enriched (+) base (4.2 g.) melted at 134°C.

A mixture of 2.15 g. of enriched (+) base and 1.5 g. of d-tartaric acid in 60 ml. of methanol was heated to a boil and then left at room temperature overnight. The crude (+) erythro-2-(2-aminoethylamino)-1,2-diphenylethanol tartrate (4 g.) was separated by filtration. The tartrate was recrystallized from 400 ml. of boiling water and gave 3.4 g. of pure salt melting at 224°–5°C. The base was liberated as above. After crystallization from a tetrahydrofuran ether mixture, the pure (+) erythro-2-(2-aminoethylamino)-1,2-diphenylethanol (1.2 g.) formed colorless needles melting at 145°–5°C. and had a rotation $[\alpha]_D^{25°}$ +9.29.

Anal Calcd, for $C_{16}H_{20}N_2O$: C, 74.96; H, 7.86; N, 10.93. Found: C, 75.12; H, 7.84; N, 10.98.

EXAMPLE 2

Erythro-2-(2-aminoethylamino)-1-(4-chlorophenyl)-2-phenylethanol and Erythro-2-(2-aminoethylamino)-2-(4-chlorophenyl)-1-phenylethanol A solution of 29 g. of trans-4-chlorostilbene oxide in 200 ml. ethylenediamine was refluxed for 20 hours. The reaction mixture was cooled, and poured into ice cold dilute sodium hydroxide and extracted with methylene chloride. The organic layer was separated, dried and concentrated in vacuo to dryness. The residue (32 g.) was dissolved in a small amount of methanol and an excess of ethanolic hydrogen chloride was added. The precipitated hydrochloride (20 g.) was separated by filtration. A second crop (7 g.) of hydrochloride was obtained from the filtrate. After several recrystallization of the first crop from methanol a pure hydrochloride (3.7 g.) melting at 276°–9°C. was obtained. A solution of this hydrochloride in ice water was treated with an excess of ammonium hydroxide and the free base was extracted into either. The ether extract was dried, filtered and concentrated to a small volume. The crystalline erythro-2-(2-aminoethylamino)-1-(4-chlorophenyl)-2-phenylethanol (1.9 g.) melting at 108°–9°C. was separated by filtration.

Anal. Calcd. for $C_{15}H_{19}ClN_2O$: C, 66.09; H, 6.59; N, 9.63. Found: C, 66.09; H, 6.57; H, 9.74.

The second crop of hydrochloride from the above reaction was purified and treated in the same manner as the first crop. This hydrochloride melted at 248°–252°C. The erythro-2-(2-aminoethylamino)-2-(4-chlorophenyl)-1-phenylethanol (2 g.) formed colorless needles melting at 91°–2°C.

Anal. Calcd. for $C_{16}H_{19}CiN_2O$: C, 66.09; H, 6.59, N, 9.63. Found: C, 66.06; H, 6.64; N, 9.78.

EXAMPLE 3

Erythro-2-(2-aminoethylamino)-2-phenyl-1-(p-tolyl)-ethanol

A solution of 16.6 g. of trans-4-methyl-stilbene oxide in 190 ml. of ethylenediamine was refluxed for 20 hours. The reaction mixture was cooled, poured into ice cold dilute sodium hydroxide and extracted with ether. The organic layer was separated, dried and concentrated in vacuo to dryness. The residue was dissolved in a small amount of methanol and an excess of ethanolic hydrogen chloride was added. The precipitated hydrochloride was separated by filtration. After several recrystallizations from methanol a pure hydrochloride was obtained melting at 267°–8°C. A solution of the hydrochloride in water was treated with an excess dilute sodium hydroxide and the crystalline base was separated. After recrystallization from ether the pure product formed colorless needles melting at 132°–3°C.

Anal. Calcd. for $C_{17}H_{22}N_2O$: C, 75.52; H, 8.20; N, 10.36. Found: C, 75.53; H, 8.31; N, 10.31.

EXAMPLE 4

Erythro-2-(3-aminopropylamino)-1,2-diphenylethanol

A solution of 20 g. of trans-stilbene oxide in 60 ml. of 1,3-propanediamine was refluxed for 24 hours. The reaction mixture was poured into ice water and extracted with methylene chloride. The organic extract was washed with water, dried and concentrated in vacuo to dryness. The residue (24 g.) was crystallized from a mixture of tetrahydrofuran and ether to give 17 g. of product melting at 99°–100°C. After recrystallization from the same solvent mixture the pure product formed colorless needles with the same melting point.

Anal. Calcd. for $C_{17}H_{22}N_2O$: C, 75.52; N, 8.20; N, 10.36. Found: C, 75.87; H, 7.91; N, 10.20.

EXAMPLE 5

Erythro-2-(4-aminobutylamino)-1,2-diphenylethanol

A mixture of 10 g. of trans-stilbene oxide, 20 ml. 1,4-diaminobutane and 20 ml. of toluene was refluxed for 20 hours. The reaction mixture was poured into dilute, ice cold hydrochloric acid and extracted with ether. The aqueous acid layer was separated, made basic with dilute sodium hydroxide and extracted with methylene chloride. The methylene chloride extract was dried and concentrated in vacuo to dryness. The residue was crystallized from a mixture of tetrahydrofuran, ether and petroleum ether to give 7.5 g. of product. After recrystallization from ether, the pure product formed colorless needles melting at 108°–110°C.

Anal. Calcd. for $C_{18}H_{24}N_2O$: C, 76.02; H, 8.51; N, 9.85. Found: C, 75.99; H, 8.30; N, 9.70.

EXAMPLE 6

Erythro-2-[N-methyl-N-(2-aminoethyl)amino]-1,2-diphenylethanol

A solution of 20 g. of trans-stilbene oxide in 35 ml. methylethylenediamine was refluxed for 16 hours. The reaction mixture was poured into ice water and extracted with methylene chloride. The organic extract was washed with water, separated, dried and concentrated in vacuo to dryness. The residue was dissolved in a small amount of methanol and an excess of ethanolic hydrogen chloride was added. The precipitated hydrochloride (12.2 g.) was separated by filtration and had a melting point of 247°–250°C. dec. After concentrating the filtrate in vacuo to a smaller volume and diluting it with isopropanol, a second crop (15.3 g.) of hydrochloride was obtained melting at 209°–212°C.

The first crop of hydrochloride was purified by recrystallization from methanol until the melting point was 263°–264°C. dec. A solution of this hydrochloride (6 g.) in ice water was made alkaline with ammonium hydroxide and the mixture was extracted with methylene chloride. The organic extract was separated, dried and concentrated in vacuo to dryness. The residue (4.3 g.) was crystallized from tetrahydrofuran and gave 3.7 g. of erythro-2-(2-methylaminoethylamino)-1,2-diphenylethanol.

The base from the second crop of the original hydrochloride was liberated as above. The residue was crystallized from ether and gave 7.9 g. of erythro-2-[N-methyl-N-(2-aminoethyl)amino]-1,2-diphenylethanol. After recrystallization from ether, the pure product formed colorless needles melting at 118°–119°C.

Anal Calcd. for $C_{17}H_{22}N_2O$: C, 75.52; H, 8.20; N, 10.36. Found: C, 75.63; H, 8.40; N, 10.29.

EXAMPLE 7

The topical antiinflammatory activity of a compound of the invention in direct comparison with dexamethasone is shown in a topical antiinflammatory test based on inhibition of cantharidin induced irritation of rat ear skin. The results of this test are summarized below in Table 1.

TABLE 1

| Treatment | | N | Mean Body Weight Initial g | Mean Body Weight Final g | Topical Antiinflammatory Activity Mean ± S.E. Ear Punch mg. | vs. Canth. | Mean ± S.E. Thymus mg. | vs. Controls |
|---|---|---|---|---|---|---|---|---|
| Controls | | 10 | 54 | 75 | 9.78 ± 0.12 | *** | 228.9 ± 12.1 | |
| Cantharidin, | 400 µg | 10 | 53 | 69 | 19.86 ± 0.95 | +103% | 211.2 ± 12.7 | −8% |
| Erythro-2-(2-aminoethylamino)-1,2-diphenylethanol | | | | | | | | |
| | 50 µg | 10 | 55 | 68 | 17.92 ± 0.37 | 19%I | 210.5 ± 11.9 | −8% |
| " | 100 µg | 10 | 55 | 70 | 17.92 ± 1.03 | 19%I | 199.1 ± 15.1 | −13% |
| " | 200 µg | 10 | 56 | 71 | 15.18 ± 0.68 | ***46%I | 230.4 ± 9.6 | +1% |
| " | 400 µg | 10 | 54 | 73 | 12.56 ± 0.44 | ***72%I | 220.6 ± 15.2 | −4% |
| " | 800 µg | 10 | 54 | 72 | 11.04 ± 0.28 | ***88%I | 214.8 ± 8.3 | −6% |
| Dexamethasone, | | | | | | | | |
| | 5 µg | 9 | 52 | 65 | 18.18 ± 0.56 | 17%I | 195.1 ± 12.4 | −15% |
| " | 10 µg | 10 | 53 | 70 | 17.32 ± 0.81 | 25%I | 201.7 ± 14.0 | −12% |
| " | 20 µg | 10 | 53 | 69 | 16.88 ± 0.89 | * 30%I | 190.4 ± 11.2 | * −17% |
| " | 40 µg | 10 | 52 | 67 | 14.56 ± 1.13 | ** 53%I | 162.9 ± 11.0 | ***−29% |
| " | 80 µg | 10 | 52 | 64 | 12.22 ± 0.75 | ***76%I | 114.5 ± 6.7 | ***−50% |

* $p < 0.05$
** $p < 0.01$
*** $p < 0.001$

Charles River CD 21 day old male rats were used. The treatment vehicle comprised 0.1 ml. of ethanol/acetone/ether (1-2-3 by volume) plus 20 percent collodion and was applied to one ear of each animal. The animals were sacrificed and autopsied 72 hours after application. A uniform disc was punched from each treated ear and weighed directly. Examination of the above results indicates that the compound of the invention gave a linear log dose response qualitatively similar to that observed for dexamethasone. Moreover, examination of the initial and final body weights and the thymus weight shows that the compound of the invention lacks undesirable systemic activity. Moreover, the lack of thymus involution suggests the mode of action is inherent in the compound and not due to adrenal corticosteroid secretion.

EXAMPLE 8

This example demonstrates the local antiinflammatory activity of a representative compound of the invention in direct comparison with a known clinically useful corticoid compound in the standard cotton pellet test granuloma procedure. The results are summarized in Table 2 below.

TABLE 2

Local Antiinflammatory Activity - Cotton Pellet Test
Mean ± Standard Error

| Treatment (Compounds in Pellet) | N (Pellets) | Pellet Weight (mg) Wet | Dry | Granuloma | % |
|---|---|---|---|---|---|
| Control | 20 | 409.3 ± 13.4 | 70.5 ± 2.1 | 36.5 ± 2.1 | — |
| Dexamethasone, 10 μg | 20 | 401.1 ± 13.0 | 64.7 ± 1.8* | 30.7 ± 1.8* | −16 |
| ″           , 20 μg | 20 | 404.1 ± 16.5 | 60.1 ± 1.9*** | 26.1 ± 1.9*** | −28 |
| ″           , 40 μg | 20 | 377.0 ± 13.4 | 57.7 ± 0.8*** | 24.3 ± 0.8*** | −34 |
| ″           , 80 μg | 20 | 323.6 ± 7.6*** | 52.5 ± 0.8*** | 18.5 ± 0.8*** | −49 |
| Erythro-2-(2-aminoethyl-amino)-1,2-diphenylethanol 1000 μg | 20 | 331.1 ± 14.7*** | 63.4 ± 2.3* | 29.5 ± 2.2* | −19 |
| ″           , 2000 μg | 20 | 327.5 ± 11.2*** | 60.1 ± 2.3** | 26.1 ± 2.3** | −28 |
| ″           , 4000 μg | 20 | 294.3 ± 7.8*** | 54.4 ± 2.1*** | 20.4 ± 2.1*** | −44 |
| ″           , 8000 μg | 20 | 292.7 ± 5.6*** | 52.5 ± 0.8*** | 18.5 ± 0.8*** | −49 |

\* $p < 0.05$
\*\* $p < 0.01$
\*\*\*$p < 0.001$

Dexamethasone and erythro-2-(2-aminoethylamino)-1,2-diphenylethanol were dissolved in ethanol to yield the desired concentration levels and 0.1 ml. of each level was applied to the respective pellets and the pellets were allowed to air dry at room temperature. Cotton pellets, weighing 34 mg., were used.

Charles River CD 32 day old male rats were implanted subcutaneously with two pellets per rat. Animals were autopsied, approximately 72 hours after pellet implantation. The pellets with adherent granuloma tissue were removed, dried to constant weight and then compared to controls which had been implanted with untreated pellets. The difference in granuloma weights was a measure of the antiinflammatory activity. A linear log dose response relationship was observed for the compound of the invention which was qualitatively similar to that observed for dexamethasone.

EXAMPLE 9

The topical antiinflammatory activity of other representative compounds of the invention utilizing the procedure of Example 7 is summarized below in Table 3.

TABLE 3

Percent Inhibition of Inflammation
Topical Dose - micrograms

| Compound | 50 (0.05%) | 100 (0.1%) | 200 (0.2%) | 400 (0.4%) | 800 (0.8%) |
|---|---|---|---|---|---|
| (−)erythro-2-(2-aminoethyl-amino)-1,2-diphenylethanol | 7 | 1 | 19 | 51** | 87*** |
| (+)erythro-2-(2-aminoethyl-amino)-1,2-diphenylethanol | 7 | 2 | 0 | 29 | 96*** |
| Erythro-2-(3-aminopropyl-amino)-1,2-diphenylethanol | 0 | 8 | 21 | 29* | 51** |
| Erythro-2-(2-aminoethyl-amino)-1-(4-chlorophenyl)-2-phenylethanol | 20* | 23 | 35* | 64*** | 90*** |
| Erythro-2-(4-aminobutylamino)-1,2-diphenylethanol | 10 | 5 | 37* | 54** | 87*** |
| Erythro-2-[N-methyl-N-(2-aminoethyl)amino]-1,2-diphenylethanol | 0 | 8 | 1 | 11 | 41** |
| Erythro-2-(2-aminoethylamino)-2-(4-chlorophenyl)-1-phenyl-ethanol | 3 | 0 | 12 | 35** | 89*** |
| Erythro-2-(2-aminoethylamino)-2-phenyl-1-(p-tolyl)ethanol | 12 | 9 | 5 | 53*** | 68*** |

Example 10
Erythro-2-(2-aminoethylamino)-1,2-diphenylethanol
Ointment

| | %/w/w |
|---|---|
| Erythro-2-(2-aminoethylamino)-1,2-diphenylethanol (Compound A) | 5.00 |
| Hydrogenated Lanolin* | 20.00 |

-continued

Example 10
Erythro-2-(2-aminoethylamino)-1,2-diphenylethanol
Ointment

| | |
|---|---|
| Mineral Oil | 10.00 |
| Butylated Hydroxy Toluene | 0.10 |
| White Petrolatum | 42.40 |
| Microcyrstalline Wax | 2.50 |
| Propylene Glycol | 20.00 |
| Lactic Acid | pH 8.0 |

*Lipo Chemical Co. - "Lipolan"

Principles of Procedure:
1. Heated to 70°C. — Hydrogenated lanolin, mineral oil, butylated hydroxy toluene, white petrolatum, microcrystalline wax.
2. Adjusted the pH of a mixture of propylene glycol and Erythro-2-(2-aminoethylamino)-1,2-diphenylethanol to pH 8.0 with lactic acid. Heated to 70°C.
3. Added Step 2 to Step 1 with stirring. Cooled to room temperature.

Lotion; Cream

| | Lotion %/w/w | Cream %/w/w |
|---|---|---|
| Compound A | 5.00 | 5.00 |
| Polawax | 5.00 | 15.00 |
| Stearyl Alcohol | 2.00 | 2.00 |
| Mineral Oil | 15.00 | 15.00 |
| Propylene Glycol | 10.00 | 10.00 |
| Methyl Paraben | 0.15 | 0.15 |

-continued

| Lotion; Cream | | |
|---|---|---|
| Propyl Paraben | 0.05 | 0.05 |
| Distilled Water q.s. | 100.00 | 100.00 |

Principles of Procedure:
1. Heated to 70°C. — Polawax, stearyl alcohol, mineral oil.
2. Heated to 70°C. — Propylene glycol, methyl paraben, propyl paraben, water.
3. Pasted Compound A with 10% of Step 2.
4. At 70°C. added Step 2 to Step 1 and stirred to 55°C.
5. At 55°C., added Step 3 to Step 4 and cooled to room temperature.

| Gel | |
|---|---|
| | %/w/w |
| Compound A | 5.00 |
| Klucel H F | 2.50 |
| Ethanol USP | 27.50 |
| Propylene Glycol | 65.00 |

Principles of Procedure:
1. Dissolved Compound A in propylene glycol and ethanol USP.
2. Added Klucel H F slowly to Step 1 and mixed until completely dissolved.

I claim:
1. A method for treating a topical inflammation, which method comprises topically applying to the situs of said inflammation an effective amount of a compound of the formula

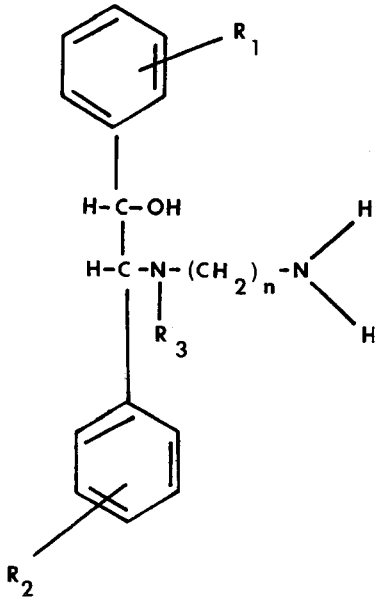

wherein $R_1$ and $R_2$ independently are hydrogen, halogen or $C_{1-4}$ lower alkyl provided, however, that one of $R_1$ or $R_2$ is hydrogen; $R_3$ is hydrogen or $C_{1-4}$ lower alkyl and n is an integer from 1 to 4 an isomer, an optical antipode or an acid addition salt thereof.

2. The method of claim 1 wherein said compound of formula I is applied in the form of a conventional topical dosage form containing from 0.01 to 20 weight percent of said compound of formula I.

3. The method of claim 2 wherein said compound of formula I is erythro-2-(2-aminoethylamino)-1,2-diphenylethanol.

4. A pharmaceutical composition useful in the topical treatment of an inflammation, said composition comprising from 0.01 to 20 weight percent of a compound of the formula

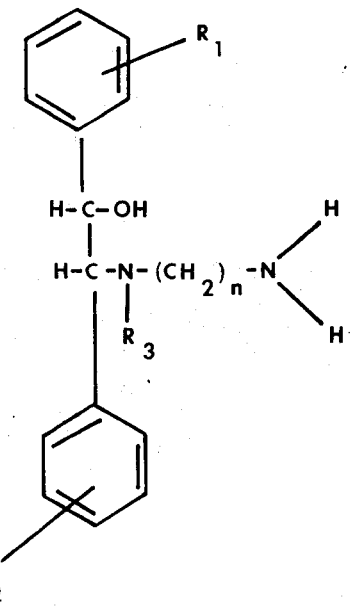

wherein $R_1$ and $R_2$ independently are hydrogen, halogen or lower alkyl provided, however, that one of $R_1$ or $R_2$ is hydrogen; $R_3$ is hydrogen or lower alkyl and n is an integer from 1 to 4 and the remainder of said composition comprises conventional pharmaceutical organic or inorganic materials for topical administration.

5. The composition of claim 4 wherein said compound of formula I is erythro-2-(2-aminoethylamino)-1,2-diphenylethanol.

6. The composition of claim 4 in ointment form.
7. The composition of claim 4 in a lotion form.
8. The composition of claim 4 in a cream form.
9. The composition of claim 4 in a gel form.

* * * * *